United States Patent [19]

Reinhold, III et al.

[11] Patent Number: 5,536,300
[45] Date of Patent: Jul. 16, 1996

[54] NATURAL GAS ENRICHMENT PROCESS

[75] Inventors: Herbert E. Reinhold, III, Annapolis; Joseph S. D'Amico, Linthicum, both of Md.; Kent S. Knaebel, Plain City, Ohio

[73] Assignee: Nitrotec Corporation, New York, N.Y.

[21] Appl. No.: 326,916

[22] Filed: Oct. 21, 1994

[51] Int. Cl.$^6$ .................................................. B01D 53/047
[52] U.S. Cl. ................................. 95/101; 95/105; 95/143
[58] Field of Search ............................... 95/98, 100–105, 95/143–147

[56] References Cited

U.S. PATENT DOCUMENTS

| | | | |
|---|---|---|---|
| 3,101,261 | 8/1963 | Skarstrom | 95/98 |
| 3,141,748 | 7/1964 | Hoke et al. | 95/100 X |
| 3,751,878 | 8/1973 | Collins | 95/105 |
| 3,944,400 | 3/1976 | Bird | 95/98 X |
| 4,077,779 | 3/1978 | Sircar et al. | 95/101 X |
| 4,305,734 | 12/1981 | McGill | 95/102 |
| 4,444,572 | 4/1984 | Avon et al. | 55/26 |
| 4,512,780 | 4/1985 | Fuderer | 95/100 |
| 4,529,412 | 7/1985 | Hayashi et al. | 55/25 |
| 4,539,020 | 9/1985 | Sakuraya et al. | 55/26 |
| 4,578,089 | 3/1986 | Richter et al. | 95/101 |
| 4,581,044 | 4/1986 | Uno et al. | 55/25 |
| 4,599,094 | 7/1986 | Werner et al. | 95/101 |
| 4,705,541 | 11/1987 | Sircar et al. | 55/26 |
| 4,711,645 | 12/1987 | Kumar | 55/26 |
| 4,770,676 | 9/1988 | Sircar et al. | 55/26 |
| 4,784,672 | 11/1988 | Sircar | 95/98 X |
| 4,790,858 | 12/1988 | Sircar | 55/26 |
| 4,813,977 | 3/1989 | Kumar et al. | 55/26 |
| 4,813,980 | 3/1989 | Sircar | 55/26 |
| 4,816,039 | 3/1989 | Krishnamurthy et al. | 95/103 X |
| 4,846,851 | 7/1989 | Garo et al. | 95/143 X |
| 4,892,565 | 1/1990 | Kumar et al. | 55/26 |
| 4,913,709 | 4/1990 | Kumar | 55/26 |
| 4,915,711 | 4/1990 | Kumar | 55/26 |
| 5,013,334 | 5/1991 | Maurer | 55/26 |
| 5,026,406 | 6/1991 | Kumar | 95/101 |
| 5,089,565 | 2/1992 | Knoblauch et al. | 55/26 |
| 5,133,785 | 7/1992 | Kumar et al. | 95/101 |
| 5,171,333 | 12/1992 | Maurer | 55/26 |
| 5,174,796 | 12/1992 | Davis et al. | 55/26 |
| 5,224,507 | 7/1993 | Mehra | 62/17 |
| 5,232,473 | 8/1993 | Kapoor et al. | 95/101 |
| 5,248,322 | 9/1993 | Kumar | 95/101 |
| 5,354,346 | 10/1994 | Kumar | 95/101 |

FOREIGN PATENT DOCUMENTS

| | | |
|---|---|---|
| 071553 | 7/1982 | European Pat. Off. . |
| 092695 | 4/1983 | European Pat. Off. . |
| 394947 | 10/1990 | European Pat. Off. . |
| 8809306 | 5/1988 | WIPO . |

OTHER PUBLICATIONS

C. Tannehill et al.; Nitrogen Removal Costs Vary by Concentration; American Oil & Gas Reporter; May 1994.

R. J. Buras et al.; Nitrogen Rejection and Pressure Swing Adsorption: Principles, Desired, and Remote Control Using an Expert System; Univ. of Oklahoma Conference Feb. 28, 1994.

Methane/Nitrogen Gas Separation Oven the Zeolite Clinoptilolite by the Selector Adsorture of Nitrogen Industrial Gas Separations 1983 Am. Chem. Society Frankiewicz et al.

A Study of Heatless Adsorption in the System $Co_2$ in He(I) Chem. Eng. Science 1972, vol. 27 pp. 1449–1458 Shendolman et al.

Study of Heatless Adsorption in the Model System $Co_2$ in the (II) Aiche Symposium Series No. 134, vol. 69 1973; Mitchell et al.

Recovery and Purification of Light Gases by PSA; Cheng et al. ACS Symposium Series #223, Industrial Gas Separations, 1983.

The Optimal Control of a Periodic Adsorptor AICHE Journal, vol. 18, No. 6 Nov. 1972; Kowler et al.

Separation of Nitrogen and Methane Via Periodic Adsortion AIche Journal, vol. 17, #2, Mar. 1971; Turnock et al.

Separation of Helium–Methane Mixtures by PSA AIche Journal, vol. 31, #1 Jan. 1985; Cheng et al.

Kinetic Separation by Pressure Swing Adsorption; Method & Model AIche Journal, vol. 36, No. 8, Aug. 1990; Ackley et al.

Separation of Nitrogen from Helium using PSA; Bind et al. Advanced Cryogenic Engineering, No. 19 pp. 463–473 1973.

A New Composite Sorbent Forn Methene–Nitrogen Separation by Adsorption & Separation Science and Technology, No. 257 (7 & 8) 845–868, 1990; Baksh et al.

*Primary Examiner*—Robert Spitzer
*Attorney, Agent, or Firm*—Michael J. McGreal

[57] ABSTRACT

A natural gas feed stream containing significant quantities of nitrogen can be increased to a content of greater than 95 percent by volume of natural gas, and preferably greater than about 98 percent, by passing the natural gas feed stream sequentially through at least four adsorbent beds which are cycled through six phases comprising an adsorption phase to adsorb natural gas, a recycle phase to remove feed gas from the voids in the adsorbent bed and nitrogen from the adsorbent by the passage of a depressurization gas therethrough to produce a recycle gas, a depressurization phase to reduce the adsorbent bed pressure to about ambient and to produce the depressurization gas, an evacuation phase where the pressure in the adsorbent is further reduced and an enriched natural gas product stream recovered, a pressurization phase where the pressure in the adsorbent bed is increased using nitrogen gas from a bed in an adsorption phase, and further pressurizing the adsorbent bed in a recycle feed pressurization phase by the flow of the recycle gas therein.

20 Claims, 3 Drawing Sheets

| ADSORBENT BED / TIME | ADSORBENT BED A | ADSORBENT BED B | ADSORBENT BED C | ADSORBENT BED D |
|---|---|---|---|---|
| 1-90 SECONDS | PRESSURIZATION + ADSORPTION | EVACUATION | DEPRESSURIZATION | RECYCLE |
| 90-180 SECONDS | RECYCLE | PRESSURIZATION + ADSORPTION | EVACUATION | DEPRESSURIZATION |
| 180-270 SECONDS | DEPRESSURIZATION | RECYCLE | PRESSURIZATION + ADSORPTION | EVACUATION |
| 270-360 SECONDS | EVACUATION | DEPRESSURIZATION | RECYCLE | PRESSURIZATION + ADSORPTION |

FIG. 3

NATURAL GAS ENRICHMENT PROCESS

FIELD OF THE INVENTION

This invention relates to a process for increasing the content of hydrocarbon gases in a hydrocarbon gas stream containing other gases. More particularly this invention relates to a process for the purification of a natural gas stream by the selective adsorption of hydrocarbon gases, the rejection of non-hydrocarbon gases, and the subsequent desorption of hydrocarbon gases to produce an enriched natural gas stream. In a particular embodiment this invention relates to the separation of nitrogen from a natural gas stream.

BACKGROUND OF THE INVENTION

The problem that exists is to provide a way to use natural gas supplies that have a content of natural gas of from about 50 percent to 95 percent by volume hydrocarbons with the remainder primarily being nitrogen. A natural gas product, which consists primarily of methane, but which can contain small quantities of higher hydrocarbons and significant amounts of nitrogen cannot be sold as a natural gas fuel unless it contains at least 1000 Btu per standard cubic foot(scf) of natural gas. This is a standard in the industry. A consequence of this standard is that there are supplies of natural gas in the ground that cannot be used. These are wells that have been capped for lack of a market for this quality of gas. The natural gas content of these supplies range down to 50 percent by volume and lower. These supplies must be upgraded for use. The various other contaminating gases must be removed.

A classical way to remove contaminating gases from a natural gas stream is through liquefaction. In these processes the contaminating gases, which primarily is nitrogen, are separated from the hydrocarbon gases and vented to the atmosphere. If the natural gas contains quantities of sulfurous gases such as hydrogen sulfide, and water and carbon dioxide these can be removed in a prior step by scrubbing with monoethanolamine to remove hydrogen sulfide followed by drying with diethylene glycol, triethylene glycol, alumina, silica gel or zeolites. Optionally, a pressure swing adsorption technique such as disclosed in European Patent 394,947A can be used to remove carbon dioxide. In liquefaction processes the gas stream containing primarily methane but also amounts of higher hydrocarbons and nitrogen is cooled to recover the higher hydrocarbons as liquids and the stream then further cooled to liquify methane which is recovered in pipeline purity and used. The remaining gas, nitrogen, can be collected as a product or vented. As an option the methane/nitrogen stream can be processed to recover helium if helium is present in a sufficient amount.

It also is known to enrich natural gas using pressure swing adsorption techniques. In U.S. Pat. No. 5,171,333 there is disclosed a technique using four adsorbent beds, each of which contains a faujasite adsorbent. Each bed in sequence goes through an adsorption step, a desorption step by lowering the pressure and then a repressurization step to bring a bed back up to adsorption pressure. The adsorption step is conducted at about 100 to 500 psia and consists of passing a feed gas into an adsorbent bed. The desorption step consists of cocurrently depressurizing an adsorbent bed and passing the gas to a bed undergoing repressurization, further cocurrently depressurizing the adsorbent bed and passing the gas as a purge gas to a bed undergoing purging, countercurrently depressurizing and collecting a methane/ethane stream and countercurrently purging the adsorption zone with a purge gas from another adsorbent bed and recovering ethane. The repressurization step consists of repressurizing the adsorbent bed by cocurrently passing a depressurization gas into the adsorbent bed and further repressurizing the adsorbent bed by passing a portion of the adsorption effluent from another adsorbent bed to this adsorbent bed.

In U.S. Pat. No. 5,174,796 there is disclosed a pressure swing adsorption process for enriching a natural gas stream which contains nitrogen. A carbon adsorbent is used and the natural gas is preferentially adsorbed. The process steps consist of cocurrent adsorption, a first cocurrent depressurization and the use of a part of this gas to repressurize another adsorbent bed, cocurrently depressurizing the adsorbent bed to a yet lower pressure and withdrawing a fuel gas stream, countercurrently depressurizing the adsorbent bed and recovering a product gas, countercurrently purging the adsorbent bed and recovering additional product gas, then countercurrently repressurizing the adsorbent bed in two repressurization steps with nitrogen gas from another adsorbent bed. This repressurization brings the adsorbent bed up to about the feed gas pressure.

These are interesting processes but they are not highly efficient in the enrichment of natural gas. The various liquefaction processes have a high capital cost and are expensive to operate. The pressure swing adsorption processes to date have not optimized the recovery of the methane product gas. The objective in increasing efficiency is to desorb essentially all of the adsorbed gas in as high a purity as possible as quickly as possible, utilizing the value of any off gases, and then put the adsorbent bed back into production as quickly as possible. This is what is accomplished in the processes of the present invention. In addition, there should be a clean separation of the nitrogen and methane. That is, there should be essentially no methane in the nitrogen gas stream which usually will be vented since methane is the primary product.

BRIEF SUMMARY OF THE INVENTION

The present invention in a preferred embodiment is directed to the enrichment of a natural gas stream to bring the natural gas stream up to pipeline quality. Typically a pipeline quality gas must contain about 98 percent by volume hydrocarbons with essentially all of the hydrocarbons being methane. This usually will provide a natural gas having a fuel content of at least 1000 Btu per scf. As natural gas is recovered at the wellhead it can contain from about 3 to 60 percent by volume nitrogen. This nitrogen content must be reduced in order to bring the natural gas up to pipeline quality.

The present technique for bringing a natural gas stream up to pipeline quality is to utilize a pressure swing adsorption process using an activated carbon adsorbent. The carbon adsorbent preferentially adsorbs the hydrocarbons and allows the non-hydrocarbons to pass through. The non-hydrocarbon stream can be collected or vented.

The pressure swing adsorption-process comprises the use of a plurality of adsorbent beds, preferably three to five and usually about four, each sequentially going through the phases of (a) adsorption; (b) recycle; (c) depressurization; (d) evacuation; (e) nitrogen gas pressurization; and (f) feed recycle pressurization.

The adsorption phase consists of flowing the natural gas stream cocurrently through an adsorbent bed until the adsorbed hydrocarbon front in the adsorbent bed approaches the exit of the adsorbent bed. At this point the feed of natural gas is stopped and the adsorbent bed is put onto the recycle phase.

The recycle phase consists of compressing and cocurrently passing a depressurization gas from another adsorbent bed that also is undergoing regeneration into the present adsorbent bed in order to remove the natural gas in the void space between the adsorbent particles and to desorb adsorbed nitrogen. As a recycle feed gas exits the adsorbent bed in a recycle phase it is optionally repressurized and is fed to an adsorbent bed that now is on a natural gas adsorption phase. At the completion of the recycle phase the void space and the adsorbent will contain more than 90 percent hydrocarbons, and preferably more than 95 percent hydrocarbons. At this point the adsorbent bed undergoes a depressurization phase.

The depressurization phase comprises reducing the pressure of the adsorbent bed and countercurrently flowing the released gas from the adsorbent bed to a compressor which increases the pressure to about the feed gas adsorption pressure or higher, with this gas being fed as a depressurization gas to a bed which has just completed an adsorption phase. This is a gas stream which contains more than 90 percent hydrocarbons, and preferably more than 95 percent hydrocarbons. This adsorbent bed then undergoes an evacuation phase.

The evacuation phase consists of reducing the pressure on the adsorbent bed and flowing the gas countercurrently from the adsorbent bed. The evacuation is conducted at a much reduced pressure, and preferably under a vacuum of at least b 20inches of mercury and preferably 28 inches of mercury or more. The evacuation gas is a product which is compressed to pipeline pressure. The adsorbent bed then undergoes a nitrogen pressurization phase.

The nitrogen pressurization phase consists of countercurrently flowing a nitrogen off gas from a bed on an adsorption phase into this adsorbent bed. The absolute pressure of this adsorbent bed will rise to about half of the operating adsorption phase pressure. The adsorbent bed then enters a recycle feed pressurization phase which consists of flowing the gas from the adsorbent bed on a recycle phase into this adsorbent bed. The adsorbent bed then repeats the cycle by undergoing an adsorption step by the flow of natural gas feed gas into the adsorbent bed.

Each adsorbent bed in turn undergoes the same process phases in sequence. While one adsorbent bed is undergoing one phase, the other adsorbent beds are undergoing other phases. The timing of the phases can vary. However, in a preferred embodiment the recycle, depressurization and evacuation phases will have about the same timing while the nitrogen pressurization phase, feed recycle pressurization phase and adsorption phase will have a combined timing about equivalent to each of these other phases. Upon exiting the pressure swing adsorption process the natural gas product will be of pipeline quality and can be introduced into a pipeline.

The present pressure swing adsorption process conserves more highly adsorbed product gas. This is accomplished by taking the gas from an adsorbent bed that is being depressurized, compressing this gas to about feed gas pressure, and flowing this gas into an adsorbent bed that has completed an adsorption phase. This recycle gas removes gas of about feed gas composition from the adsorbent bed void space and removes nitrogen gas which has been adsorbed in the pores of the adsorbent. This recycle feed gas then is fed to an adsorbent bed that will be undergoing an adsorption phase. In this way the content of the more strongly adsorbed component is maintained in the pressure swing system. The only gases exiting the pressure swing system are the product gas and the less strongly adsorbed secondary product. By maintaining the more strongly adsorbed component in the pressure swing system until separated from the other gases the efficiency of the system is increased.

BRIEF DESCRIPTION OF THE DRAWING

FIG. 3 sets out in tabular form the cycle times for a four adsorbent bed pressure swing adsorption system for the removal of nitrogen from a natural gas stream.

DETAILED DESCRIPTION OF THE INVENTION

The present process in a preferred embodiment is directed to the enrichment of a natural gas stream by the removal of substantially all of the nitrogen gas content of this stream. The remaining component primarily is methane. This process is a pressure swing adsorption process wherein the hydrocarbon content of the natural gas stream is preferentially adsorbed by the adsorbent. Preferential adsorption is the technique where one or more substances are more strongly adsorbed than other substances. In this phenomenon essentially all of the substances are adsorbed by the adsorbent. As the adsorption progresses the more strongly adsorbed gases occupy the space within the adsorbent. The net result is that at the time of breakthrough of the more strongly adsorbed component from the bed the more strongly adsorbed components to a large extent have saturated the adsorbent bed while the less strongly adsorbed components to a large extent have exited the adsorbent bed.

In the present pressure swing adsorption process the adsorbent preferably is an activated carbon which includes the substances known as carbon molecular sieves. The activated carbon can be derived from wood, coal, coconut or petroleum sources. The requirement is that the activated carbon have a selectivity for hydrocarbons greater than that for nitrogen and other gases. The adsorbent characteristics that determine selectivity for hydrocarbons include pore structure, pore size and treatment conditions. Activated carbons that are suitable have a carbon tetrachloride number of about 60, a surface area of more than about 1150 sq. meters/g., a density of about 0.45 g./cc. and an average particle diameter of about 3 mm to 5 mm, and preferably about 4 mm. However, any adsorbent can be used as long as it has a greater selectivity for hydrocarbons than for nitrogen. In this way the hydrocarbon content of the natural gas is preferentially adsorbed with the nitrogen exiting the adsorbent bed. The hydrocarbons subsequently are desorbed from the adsorbent bed and recovered for use.

Pressure swing adsorption systems are usually comprised of two or more adsorbent beds. The number of adsorbent beds used is the number that provides the overall economic benefit. That is, the pressure swing adsorption system that is selected must give the lowest overall cost considering the capital cost of the equipment and the operating cost. In this regard most pressure swing adsorption systems are efficient when three to five adsorbent beds are used. In the present pressure swing adsorption process to enrich the hydrocarbon content of a natural gas stream three to five adsorbent beds can be used. However, it is preferred to use four adsorbent beds. The economics are very favorable using four adsorbent beds.

Figure 1:
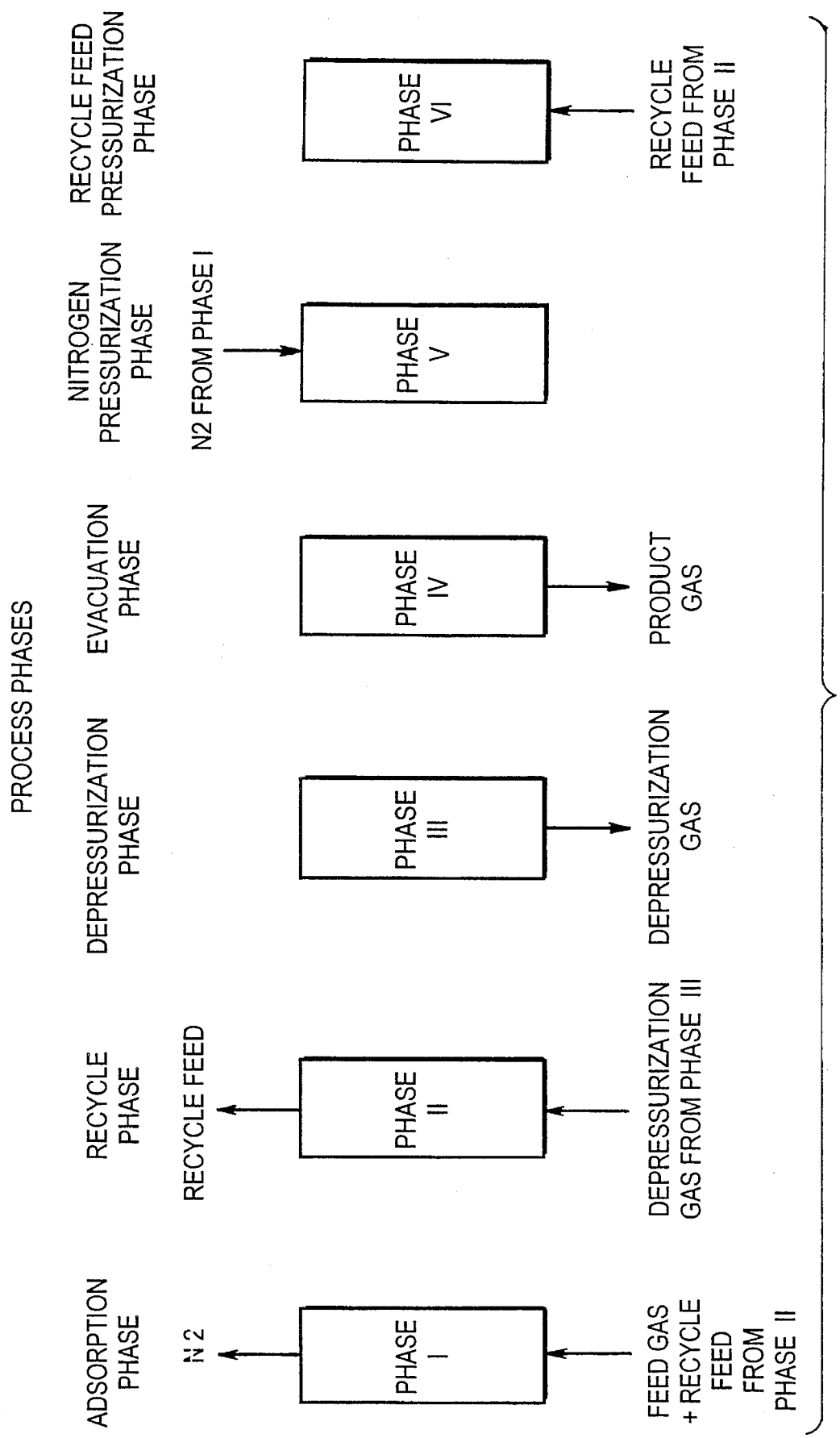
FIG. 1 sets out in a schematic form the six phases used in the adsorbent bed pressure swing adsorption system.

As schematically described in FIG. 1 the process consists of six phases. These are an adsorption phase, a recycle phase, a depressurization phase, an evacuation phase, a nitrogen pressurization phase and a recycle feed pressurization phase. In the Phase I adsorption phase a natural gas feed gas along with some recycle feed gas is fed to an adsorbent bed until the more strongly adsorbed hydrocarbon gases are about to exit the adsorbent bed. This is breakthrough. At this point the input of the natural gas feed ceases and the adsorbent bed undergoes a recycle phase. During the recycle phase a depressurization gas from an adsorbent bed undergoing a Phase III depressurization phase is compressed and flowed through an adsorbent bed on a Phase II recycle phase and the exiting recycle feed gas is flowed to an adsorbent bed in a Phase VI recycle feed pressurization phase and to an adsorbent bed in an adsorption phase. This recycle feed gas has about the same composition as the feed gas.

As adsorption progresses an adsorption front moves toward the exit end of the adsorbent bed. Before the adsorption front the gases in the adsorbent bed consist of the lightly adsorbed or non-adsorbed gases. These are the gases that have not been adsorbed and the gases in the void space. Behind the adsorption front the gases are primarily the feed gas and the adsorbed gases in the adsorbent.

In a first step of regeneration this adsorbent bed undergoes the Phase II recycle phase. This removes feed gas from the void space of the adsorbent bed and nitrogen from the adsorbent. In this recycle phase the depressurization gas from an adsorbent bed undergoing depressurization is compressed and flowed cocurrently through this adsorbent bed with the effluent recycle feed gas flowed to an adsorbent bed on Phase I adsorption phase and a phase VI recycle pressurization. At the completion of the recycle phase the adsorbent bed will contain 90 percent or more and preferably 95 percent or more of the more strongly adsorbed hydrocarbon components. This adsorbent bed then undergoes a Phase III depressurization phase.

In the Phase III depressurization the pressure in the adsorbent bed is reduced and an effluent gas flowed countercurrently from the adsorbent bed. This depressurization gas is compressed to about the pressure of the feed gas to the pressure swing system or higher and is fed to the adsorbent bed that is entering a Phase II recycle phase. The depressurization gas will contain more than 90 percent by volume, and preferably more than 95 percent by volume, of the more strongly adsorbed hydrocarbon components. The adsorbent bed then undergoes a Phase IV evacuation phase.

In the Phase IV evacuation phase a vacuum is drawn on the adsorbent bed to a vacuum of more than about 20 inches of Hg and preferably to more than about 28 inches of Hg. The evacuated gas flows countercurrently from the adsorbent bed. This gas is comprised of the more strongly adsorbed components which in the present process are hydrocarbons, and primarily methane, which has a content of 98 percent or more by volume. This is recovered as a product. The adsorbent bed then undergoes repressurization to feed gas pressure.

The Phase V nitrogen pressurization phase consists of flowing the less strongly adsorbed effluent nitrogen gas from an adsorbent bed on a Phase I adsorption phase countercurrently into the adsorbent bed being repressurized. This nitrogen gas pressurization plus the phase VI recycle feed pressurization by the cocurrent flow of recycle feed gas into this adsorbent bed brings this adsorbent bed up to the feed gas pressure prior to the introduction of feed gas and the start of another phase I adsorption. Optionally there also can be a feed gas pressurization.

FIG. 1 sets out in a schematic diagram the preferred four adsorbent bed pressure swing adsorption system for the enrichment of the hydrocarbon content of a natural gas stream. If this natural gas stream contains significant amounts of hydrogen sulfide it will be pretreated by scrubbing with monoethanolamine. The feed gas can be dried by treatment with diethylene glycol or triethylene glycol or by passage through a bed of alumina, silica or aluminosilicate zeolites. The feed to the pressure swing adsorption system in FIG. 1 will be a gas containing primarily hydrocarbons and nitrogen. There will be minor amounts of other gases present.

The natural gas feed gas is fed to the system at a pressure of about 25 to about 150 psia, and preferably about 50 psia. The feed gas passes through inlet pipe 10 and through valve 12 and conduit 14. The system will be illustrated with adsorbent bed A undergoing the nitrogen pressurization, recycle feed pressurization and adsorption phases and then describing the other phases for the other adsorbent beds. White adsorbent bed A will be undergoing these three phases adsorbent beds B, C and D will be undergoing the other phases of evacuation, depressurization and recycle, respectively. For the nitrogen pressurization phase valve 38 on adsorbent bed A will be open with the other adsorbent bed A valves 30, 32, 34, 36 and 40 being closed. In the subsequent recycle feed pressurization of adsorbent bed A valve 32 will be open with the other adsorbent bed A valves 30, 34, 36, 38 and 40 being closed. Valve 24 also will be open with valve 12 closed during recycle feed repressurization. When adsorbent bed A is in an adsorption phase valve 32 will be opened with valves 30, 34 and 36 of adsorbent bed A closed. On the exit end of adsorbent bed A valve 38 is open with the valve 40 being closed. The less strongly adsorbed gas exiting adsorbent bed A during the adsorption phase passes through valve 38 and conduit 21, with some of this less strongly adsorbed gas stored in tank 26. Less strongly adsorbed gas which is not used in the system is bled off through valve 78 and conduit 28. Tank 26 stores less strongly adsorbed gas that is to be used to pressurize adsorbent beds in a nitrogen pressurization phase.

This completes the nitrogen pressurization, recycle feed pressurization and adsorption phases for adsorbent bed A. During this period of time adsorbent bed D has been on a Phase II recycle phase. When adsorbent bed D enters a recycle phase valves 66 and 76 on adsorbent bed D are opened with all other adsorbent bed D valves 72, 68, 70 and 74 being closed. The input depressurization gas to adsorbent bed D flows from adsorbent bed C which is on a depressurization phase through valve 58 to conduit 18 and on to compressor 29 where the pressure is raised to about feed gas input pressure or higher. All of the other valves 54, 56, 60, 62 and 64 on adsorbent bed C are closed. The depressurization gas then flows by conduit 22 (with tank 25 available for storage of this gas) feed gas exits adsorbent bed D through valve 76 and conduit 20 to the feed gas input line 14. Tank 16 stores recycle feed gas and valve 24 regulates the flow of the recycle feed gas.

At this same time adsorbent bed B is on a phase IV evacuation phase. During this phase adsorbent bed B valve 48 is open with all other adsorbent bed B valves 42, 44, 46, 50 and 52 being closed. This adsorbent Bed B is evacuated to more than about 20 inches of Hg vacuum and preferably to more than about 28 inches of Hg vacuum by vacuum pump 17. This product gas which flows through conduit 11 is more than 95 percent more strongly adsorbed hydrocarbon gases, and preferably more than 98 percent more strongly adsorbed hydrocarbon gases. This pressure of this product gas is then boosted to use pressure, which can be pipeline pressure, by compressor 19.

In conduit 21 there is a check valve 91 and a throttle valve 93. Check valve will allow flow from the adsorbent beds to tank 26 but not in the reverse direction. Throttle valve provides a regulated flow to the adsorbent beds during the nitrogen pressurization phases.

As an option conduit 98 connects to conduit 18 before compressor 29 and connects to conduit 11 after vacuum pump 17. This conduit 98 has a valve 99. Valve 99 will be open depending on the hydrocarbon concentration of the feed gas. If the feed gas has a hydrocarbon concentration of less than about 75 percent by volume then valve 99 will be opened during part of the evacuation phase. This will provide additional gas as needed during the recycle phase. If the hydrocarbon concentration of the feed gas is greater than about 75 percent then valve 99 will be open during part of the depressurization phase. This will remove gas from the system. The objective is to provide a sufficient amount of recycled depressurization gas during the depressurization phase.

The phases of the process have been described for one segment of a cycle. In order to complete a full cycle each of the adsorbent beds must undergo each phase. Upon the completion of a full cycle the cycles are then repeated. In FIG. 3 there is a phase sequencing for a full cycle which consists of 360 seconds. This is a preferred timing. The timing will be affected by many factors including feed stream composition, adsorbent bed geometry and adsorbent particle size. This phase sequence is for four adsorbent beds. Consequently, the time periods are set at 90 seconds each. In this regard one 90 seconds sequence for each adsorbent bed consists of the nitrogen pressurization phase, the recycle feed pressurization phase and adsorption phase. The adsorption part of the sequence can be up to 60 seconds, but usually will be about 45 to 60 seconds depending on factors such as the more strongly adsorbed hydrocarbon content of the feed gas. The time allocated for both the nitrogen pressurization phase and the recycle feed pressurization phases will be about 30 to 45 seconds. This will be divided between these phases. Adsorption should be continued until just prior to breakthrough and then the recycle phase of the sequence initiated. During the adsorption phase recycle feed gas is fed to the adsorbent bed along with the feed gas. This provides for a maximum conservation of the product components in the feed gas. While one of the adsorbent beds is going through these three phases with a combined timing of 90 seconds the other adsorbent beds are going through a single phase for the entire 90 seconds.

The adsorbent beds sequentially go through these phase sequences in the order as set out in FIG. 3. In Table 1 there is set out the position of the valves for a full cycle of operation. The valve numbers are with reference to the schematic diagram of FIG. 2. By reference to Table 1 and FIG. 2 the operation of a full cycle of 360 seconds of the pressure swing adsorption process can be conducted.

The X notation designates the nitrogen pressurization phase and will in a 90 seconds pressure swing timing be about 15 seconds. Y designates the recycle feed pressurization phase and will be about 15 to 30 seconds. The remainder of the 90 second pressure swing timing will be an adsorption phase. This will be about 45 to 60 seconds depending on the length of the recycle feed pressurization phase. During each 90 second period there will be an adsorbent bed on the three phase sequence of nitrogen pressurization, feed recycle pressurization and adsorption.

TABLE 1

| | OPERATING CYCLE VALVE POSITION | | | |
|---|---|---|---|---|
| VALVE* | 0–90 SECONDS X/Y/Z | 90–180 SECONDS X/Y/Z | 180–270 SECONDS X/Y/Z | 270–360 SECONDS X/Y/Z |
| 12 | C/C/O | C/C/O | C/C/O | C/C/O |
| 24 | C/O/C | C/O/C | C/C/C | C/C/C |
| 30 | C/C/C | O/O/O | C/C/C | C/C/C |
| 32 | C/O/O | C/C/C | C/C/C | C/C/C |
| 34 | C/C/C | C/C/C | O/O/O | C/C/C |
| 36 | C/C/C | C/C/C | C/C/C | O/O/O |
| 38 | O/C/O | C/C/C | C/C/C | C/C/C |
| 40 | C/C/C | O/O/O | C/C/C | C/C/C |
| 42 | C/C/C | C/C/C | O/O/O | C/C/C |
| 44 | C/C/C | C/O/O | C/C/C | C/C/C |
| 46 | C/C/C | C/C/C | C/C/C | O/O/O |
| 48 | O/O/O | C/C/C | C/C/C | C/C/C |
| 50 | C/C/C | O/C/O | C/C/C | C/C/C |
| 52 | C/C/C | C/C/C | O/O/O | C/C/C |
| 54 | C/C/C | C/C/C | C/C/C | O/O/O |
| 56 | C/C/C | C/C/C | C/O/O | C/C/C |
| 58 | O/O/O | C/C/C | C/C/C | C/C/C |
| 60 | C/C/C | O/O/O | C/C/C | C/C/C |
| 62 | C/C/C | C/C/C | O/C/O | C/C/C |
| 64 | C/C/C | C/C/C | C/C/C | O/O/O |
| 66 | O/O/O | C/C/C | C/C/C | C/C/C |
| 68 | C/C/C | C/C/C | C/C/C | C/O/O |
| 70 | C/C/C | O/O/O | C/C/C | C/C/C |
| 72 | C/C/C | C/C/C | O/O/O | C/C/C |
| 74 | C/C/C | C/C/C | C/C/C | O/C/O |
| 76 | O/O/O | C/C/C | C/C/C | C/C/C |

(O = opened; C = closed)

The size of each adsorbent bed will depend on the particular gas stream, gas flows, hydrocarbon content and other factors such as capital cost. The adsorbent beds will range in height of from about 2 to 15 meters or more. The width or diameter of each adsorbent bed will be from about 1.5 meters to 4 meters or more. Each bed will contain from 1000 pounds to 40,000 pounds of adsorbent. The flow rate of gas through the beds will be in the range of about 300 to 3000 scf/minute depending on the adsorbent bed size.

Standard piping, valves and controllers can be used. The on/off valves will usually be butterfly valves. Throttle valves and check valves are used where noted. In most instances the system will be computer controlled, with built in safeguards.

The preferred embodiments of the present hydrocarbon recovery processes have been disclosed in this specification. However various modifications can be made to the processes and yet comprise the present concepts. Such modifications are considered to be within the present discoveries.

EXAMPLE

Figure 2:
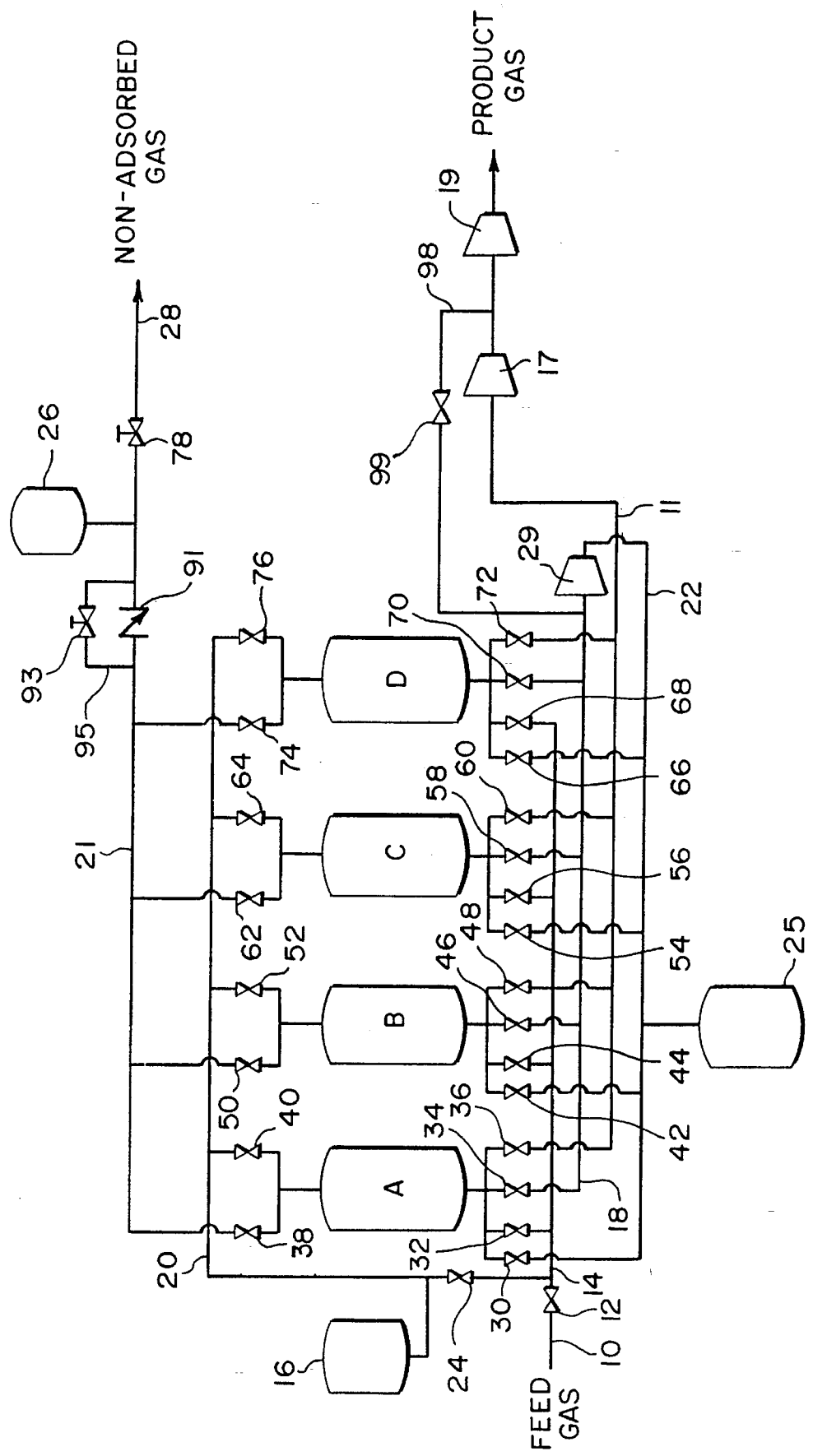
FIG. 2 is a schematic of a four adsorbent bed system for the separation of nitrogen from a nitrogen containing natural gas stream.

A natural gas stream having a hydrocarbon content of 70 percent by volume is fed at a pressure of 50 psia to a pressure swing adsorption system as shown in FIG. 2 where the adsorbent beds each contain about 4250 pounds of activated carbon adsorbent. The cycle timing is as shown in FIG. 3 with adsorption being 45 seconds, nitrogen pressurization 15 seconds and recycle feed pressurization 30 seconds. The flow rate is 694 scfm. The output product natural gas is pipeline quality at a purity of 98 percent hydrocarbons by volume. The product gas is produced at a rate of 471 scfm. The pressure swing system operates continuously until the system needs maintenance.

We claim:

1. A method for purifying a gas stream containing primarily hydrocarbon gases and nitrogen by flowing said gas stream through a plurality of adsorbent beds each containing an adsorbent which selectively adsorbs said hydrocarbon gases with said nitrogen gas substantially passing therethrough, cycling each of said adsorbent beds sequentially through a series of phases comprising an adsorption phase, a recycle phase, a depressurization phase, an evacuation phase, a nitrogen pressurization phase and a recycle feed pressurization phase, said adsorption phase comprising passing said gas stream into a first adsorbent bed at an elevated pressure for a first part of a first period of time with said hydrocarbon gases being adsorbed therein and collecting a portion of said nitrogen gas substantially passing therethrough for use in pressurizing an adsorbent bed that is to enter said adsorption phase, while said first adsorbent bed is in said adsorption phase depressurizing a third adsorbent bed in said depressurization phase to a first lower pressure to produce a depressurization gas and passing said depressurization gas through a fourth adsorbent bed in said recycle phase and collecting a recycle feed gas therefrom for use at least in further pressurizing an adsorbent bed that is to enter said adsorption phase, and evacuating a second adsorbent bed in said evacuation phase to a lowest pressure and recovering a hydrocarbon gas product containing substantially hydrocarbon gases, said first adsorbent bed prior to undergoing said adsorption phase being repressurized with a portion of said nitrogen gas in said nitrogen pressurization phase and then with a portion of said recycle feed gas in said recycle feed pressurization phase.

2. A method as in claim 1 wherein when said gas stream contains less than about 75 percent by volume hydrocarbons a portion of the hydrocarbon gas product is flowed to the fourth adsorbent bed undergoing said recycle phase.

3. A method as in claim 1 wherein when said gas stream contains more than about 75 percent by volume hydrocarbons a portion of the depressurization gas is flowed to said hydrocarbon gas product.

4. A method as in claim 1 wherein said first adsorbent bed is pressurized by said nitrogen gas and is flowed countercurrent to the flow of said gas stream in said adsorption phase and then a portion of said recycle feed gas is flowed cocurrent with the flow of said gas stream in said adsorption phase to pressurize said first adsorbent bed.

5. A method as in claim 1 wherein each of said recycle phase, said depressurization phase and said evacuation phase are conducted for equivalent periods of time and said nitrogen pressurization phase, said recycle feed pressurization phase and said adsorption phase are collectively conducted for said equivalent period of time.

6. A method as in claim 1 wherein there are at least three adsorbent beds.

7. A method as in claim 1 wherein said adsorbent is a porous activated carbon material that is selective for the adsorption of hydrocarbons.

8. A method is in claim 1 wherein the depressurization gas from said third adsorbent bed contains more than about 90 percent by volume hydrocarbon gases.

9. A method as in claim 1 wherein the hydrocarbon gas product from said second adsorbent bed contains more than about 98 percent by volume hydrocarbon gases.

10. A method as in claim 1 wherein said elevated pressure is a pressure of about 25 to 150 psia.

11. A method for purifying a gas stream containing primarily hydrocarbon gases and nitrogen by flowing said gas stream at an elevated pressure through a plurality of adsorbent beds each containing an adsorbent which selectively adsorbs said hydrocarbon gases with said nitrogen gas substantially passing therethrough, cycling each of said adsorbent beds sequentially through a series of phases comprising an adsorption phase, a recycle phase, a depressurization phase, an evacuation phase, a nitrogen pressurization phase and a recycle feed pressurization phase, said adsorption phase comprising flowing said gas stream at an elevated pressure into an adsorbent bed undergoing said adsorption phase with said hydrocarbon gases being adsorbed in said adsorbent bed and said nitrogen gas substantially passing therethrough; said recycle phase comprising compressing an effluent depressurization gas from an adsorbent bed undergoing said depressurization phase and flowing said depressurization gas into an adsorbent bed which has completed said adsorption phase and is in said recycle phase with a recycle feed gas flowing therefrom, flowing a portion of said recycle feed gas to an adsorbent bed that is to undergo said adsorption phase to at least partially pressurize said adsorbent bed; said evacuation phase comprising reducing the pressure in an adsorbent bed that has completed said depressurization phase to less than about ambient pressure and recovering a product gas that contains adsorbed hydrocarbon gases; said pressurization phase comprising flowing a portion of said nitrogen gas from an adsorbent bed on said adsorption phase into an adsorbent bed on said nitrogen pressurization phase to at least partially pressurize said adsorbent bed, and said recycle feed pressurization phase comprising flowing said recycle feed gas into an adsorbent bed which has completed said nitrogen pressurization phase to additionally pressurize said adsorbent bed.

12. A method as in claim 11 wherein when said gas stream contains more than about 75 percent by volume hydrocarbons a portion of the depressurization gas is flowed to hydrocarbon gas product.

13. A method as in claim 11 wherein when said gas stream contains less than about 75 percent by volume hydrocarbons a portion of the adsorbed hydrocarbon product gas from said evacuation phase is flowed to the adsorbent bed undergoing said recycle phase.

14. A method as in claim 11 wherein in said evacuation phase the gas in an adsorbent bed undergoes a reduction in pressure to more than about 20 inches of Hg vacuum flows in a direction countercurrent to the flow of said gas stream in said adsorption phase.

15. A method as in claim 11 wherein in said recycle phase the gas in an adsorbent bed undergoing the recycle phase flows cocurrent to the flow of said gas stream in said adsorption phase.

16. A method as in claim 11 wherein in the conduct of the phases there are at least three adsorbent beds.

17. A method as in claim 11 wherein said adsorbent is a porous activated carbon that is selective for the adsorption of hydrocarbons.

18. A method as in claim 11 wherein the hydrocarbon gas product from the evacuation phase contains more than about 95 percent by volume hydrocarbon gases.

19. A method as in claim 18 wherein the hydrocarbon gas product from the evacuation phase contains more than about 98 percent by volume hydrocarbon gases.

20. A method as in claim 11 wherein said elevated pressure is about 25 to 150 psia.

* * * * *